US009603029B2

(12) United States Patent
Barrett et al.

(10) Patent No.: US 9,603,029 B2
(45) Date of Patent: Mar. 21, 2017

(54) MOBILE COMMUNICATIONS NETWORK, MOBILE COMMUNICATIONS DEVICE, RELAY NODE AND METHOD

(71) Applicant: SCA IPLA HOLDINGS INC., New York, NY (US)

(72) Inventors: Stephen Barrett, Thatcham (GB); Alan Jones, Calne (GB)

(73) Assignee: SCA IPLA HOLDINGS INC., New York, NY (US)

( * ) Notice: Subject to any disclaimer, the term of this patent is extended or adjusted under 35 U.S.C. 154(b) by 180 days.

(21) Appl. No.: 14/150,484

(22) Filed: Jan. 8, 2014

(65) Prior Publication Data

US 2014/0126464 A1    May 8, 2014

Related U.S. Application Data

(63) Continuation of application No. PCT/GB2012/051328, filed on Jun. 12, 2012.

(30) Foreign Application Priority Data

Jul. 8, 2011 (GB) .................................... 1111739.7

(51) Int. Cl.
*H04W 16/26* (2009.01)
*H04B 7/15* (2006.01)
(Continued)

(52) U.S. Cl.
CPC .............. *H04W 16/26* (2013.01); *H04B 7/15* (2013.01); *H04B 7/155* (2013.01); *H04L 1/08* (2013.01);
(Continued)

(58) Field of Classification Search
CPC ................................. H04W 16/26; H04B 7/15
See application file for complete search history.

(56) References Cited

U.S. PATENT DOCUMENTS 7,302,009 B2 * 11/2007 Walton .................. H04B 7/043
375/130
7,577,128 B2 * 8/2009 Khan .................... H04L 1/0065
370/345

(Continued)

FOREIGN PATENT DOCUMENTS

EP    1 919 124 A2    5/2008
EP    2 110 999 A1    10/2009
(Continued)

OTHER PUBLICATIONS

Search Report dated Nov. 4, 2011, in British Application No. 1111739.7, filed Jul. 8, 2011.

(Continued)

Primary Examiner — Rasheed Gidado
(74) Attorney, Agent, or Firm — Oblon, McClelland, Maier & Neustadt, L.L.P.

(57) ABSTRACT

A mobile communications network includes plural base stations in a network and configured to transmit to mobile communications devices a broadcast signal providing a sequence of data blocks in a sequence of transmission frames, each data block of the sequence being transmitted by each of the base stations contemporaneously for each of the sequence of transmission frames. One or more relay nodes are configured to receive the broadcast signal transmitted by one of the base stations and retransmit the broadcast signal, as the sequence of data blocks in the sequence of transmission frames on the same frequency as the broadcast signal transmitted by the base station, so that one or more of the mobile communications devices can receive the broadcast signal and recover the sequence of data blocks from one or both of the broadcast signal transmitted by the base station or the broadcast signal transmitted by the relay node.

12 Claims, 14 Drawing Sheets

(51) Int. Cl.
*H04B 7/155* (2006.01)
*H04L 1/08* (2006.01)
*H04L 12/18* (2006.01)
*H04L 1/00* (2006.01)
*H04W 4/06* (2009.01)
*H04W 84/04* (2009.01)

(52) U.S. Cl.
CPC ...... *H04L 12/1868* (2013.01); *H04L 12/1881* (2013.01); *H04L 12/189* (2013.01); *H04L 2001/0093* (2013.01); *H04L 2001/0097* (2013.01); *H04W 4/06* (2013.01); *H04W 84/047* (2013.01)

(56) References Cited

U.S. PATENT DOCUMENTS

| | | | | |
|---|---|---|---|---|
| 8,204,018 | B2* | 6/2012 | Chindapol | H04B 7/2606 370/330 |
| 8,340,029 | B2* | 12/2012 | Chion | H04W 72/04 370/312 |
| 8,705,432 | B2* | 4/2014 | Min | H04B 7/2606 370/315 |
| 9,030,977 | B2* | 5/2015 | Chen | H04B 7/15542 370/310 |
| 2008/0108355 | A1* | 5/2008 | Oleszcsuk | H04W 72/1263 455/442 |
| 2009/0185521 | A1* | 7/2009 | Li | H04B 1/7107 370/315 |
| 2010/0278036 | A1 | 11/2010 | Dai et al. | |
| 2012/0155361 | A1* | 6/2012 | Wei | H04W 4/06 370/312 |

FOREIGN PATENT DOCUMENTS

| | | |
|---|---|---|
| EP | 2 299 739 A1 | 3/2011 |
| JP | 2008-283656 A | 11/2008 |
| JP | 2011-525772 | 9/2011 |
| WO | WO 2010/002100 A2 | 1/2010 |
| WO | WO 2010/061053 A1 | 6/2010 |
| WO | WO 2011/052135 A1 | 5/2011 |
| WO | WO 2011/078837 A1 | 6/2011 |

OTHER PUBLICATIONS

International Search Report mailed Sep. 28, 2012, in Application No. PCT/GB2012/051328, filed Jun. 12, 2012.

ZTE: "Cooperative Transmission for Broadcast Service in Type II Relay Scenario", 3GPP Draft; R2-093890 Cooperative Transmission for Broadcast Service in Type II Relay Scenario, $3_{rd}$ Generation Partnership Project (3GPP), Mobile Competence Centre; 650, Route Des Lucioles; F-06921 Sophia-Antipolis Cedex; France, No. Los Angeles, USA; Jun. 23, 2009.

Alcatel Shanghai Bell, et al: "Discussion on Technologies for Further Enhanced MBMS", 3GPP Draft; R1-082815 Discussion on Technologies for Further Enhanced MBMS, $3^{rd}$ Generation Partnership Project (3GPP), Mobile Competence Centre; 650, Route Des Lucioles; F-06921 Sophia-Antipolis Cedex; France, No. Jeju; Aug. 12, 2008.

"$3^{rd}$ Generation Partnership Project; Technical Specification Group Radio Access Network; Evolved Universal Terrestrial Radio Access (E-UTRA); Physical layer for relaying operation (Release 10)", 3GPP Standard; 3GPP TS 36.216, $3^{rd}$ Generation Partnership Project (3GPP), Mobile Competence Centre; 650, Route Des Lucioles; F-06921 Sophia-Antipolis Cedex; France, vol. RAN WG1, No. V10.3.0, Jun. 21, 2011.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP Standard; 3GPP TS 36.300, $3^{rd}$ Generation Partnership Project (3GPP), Mobile Competence Centre; 650, Route Des Lucioles; F-06921 Sophia-Antipolis Cedex; France, vol. RAN WG2, No. V10.4.0, Jun. 22, 2011.

Office Action issued Jan. 26, 2016 in Japanese Patent Application No. 2014-519621.

Japanese Office Action dated Jun. 21, 2016, issued in Japanese Patent Application No. 2014-519621 (with English translation).

* cited by examiner

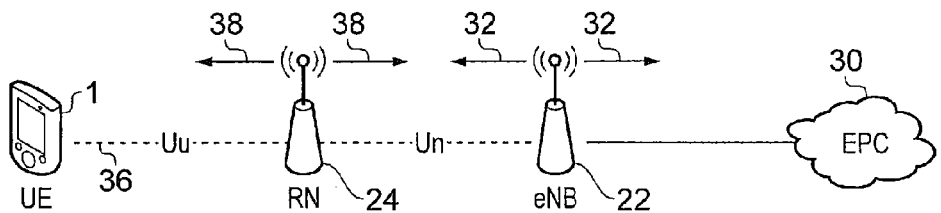
FIG. 3: Architecture of system deployment with a relay node
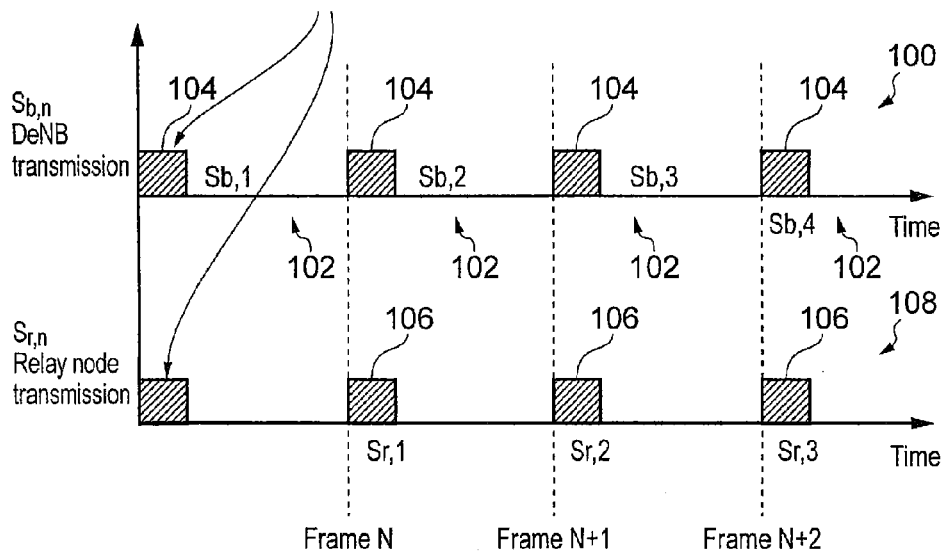
FIG. 5: Showing DeNB layer and RN layer transmitting in a synchronised fashion on the same sub-frames

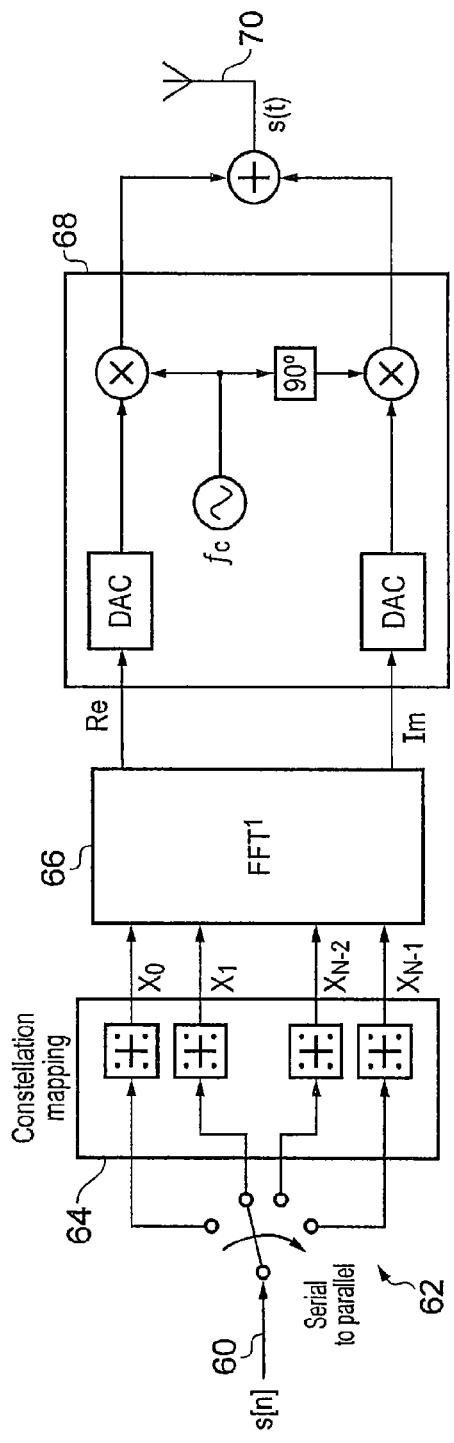
FIG. 8a OFDM transmitter
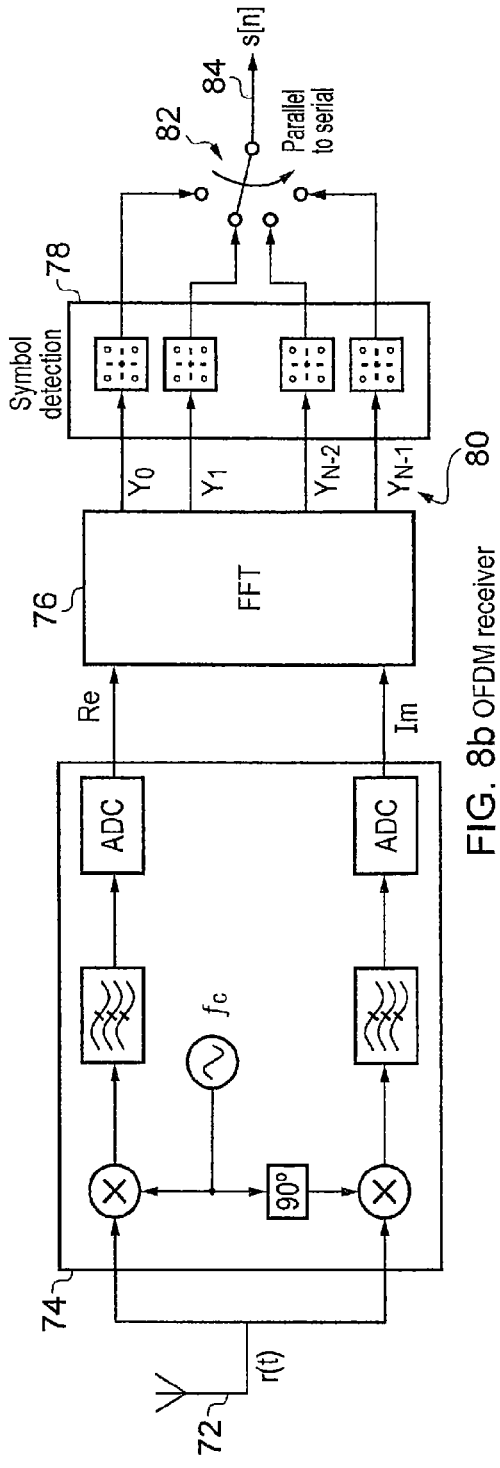
FIG. 8b OFDM receiver

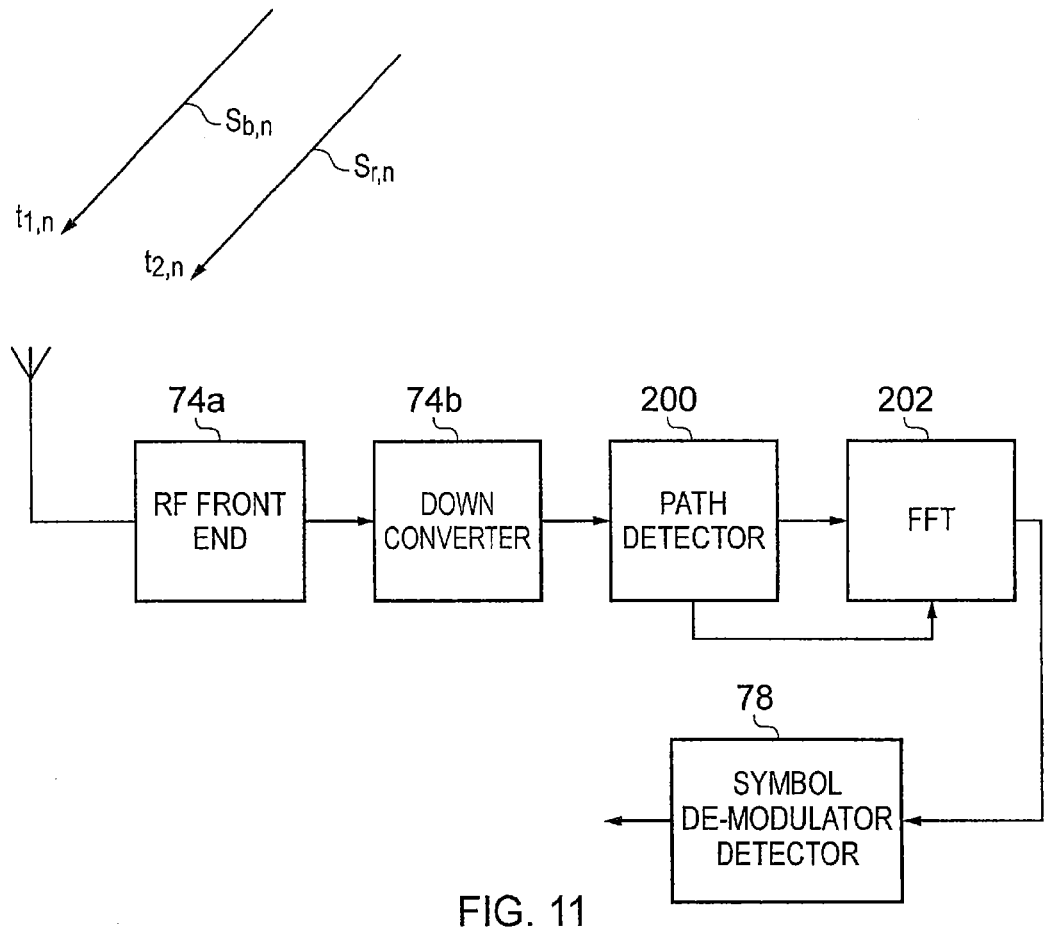

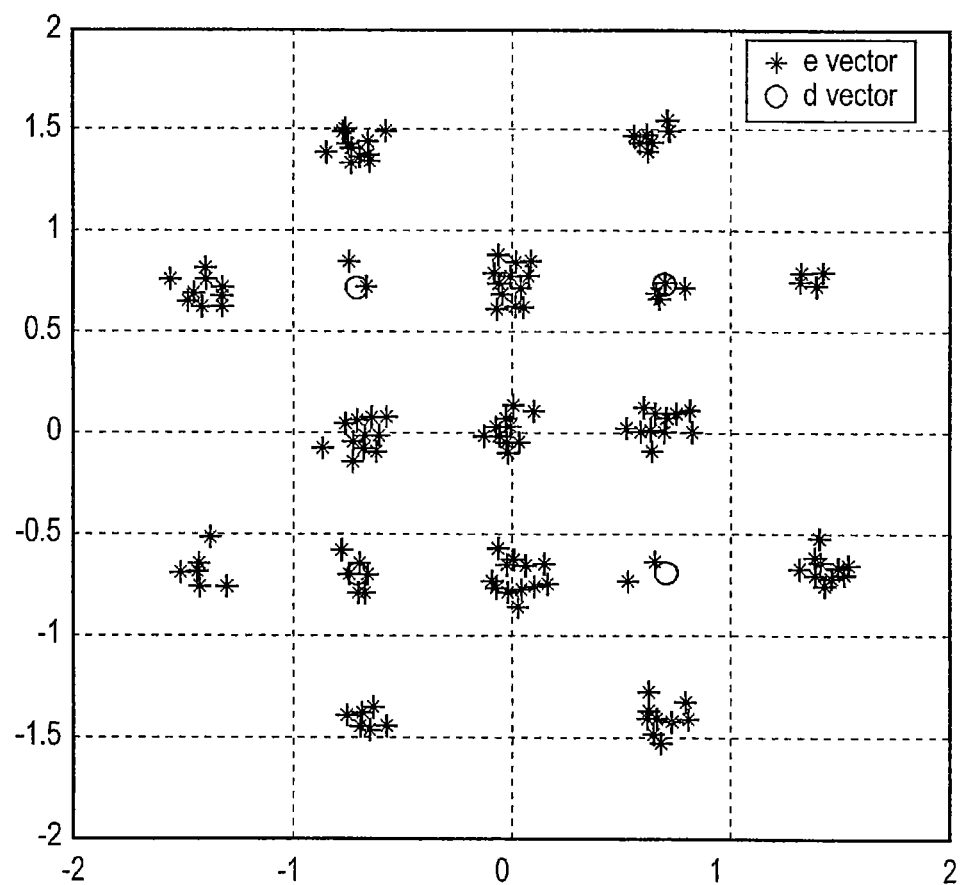
FIG. 13 Received vector at input to UE

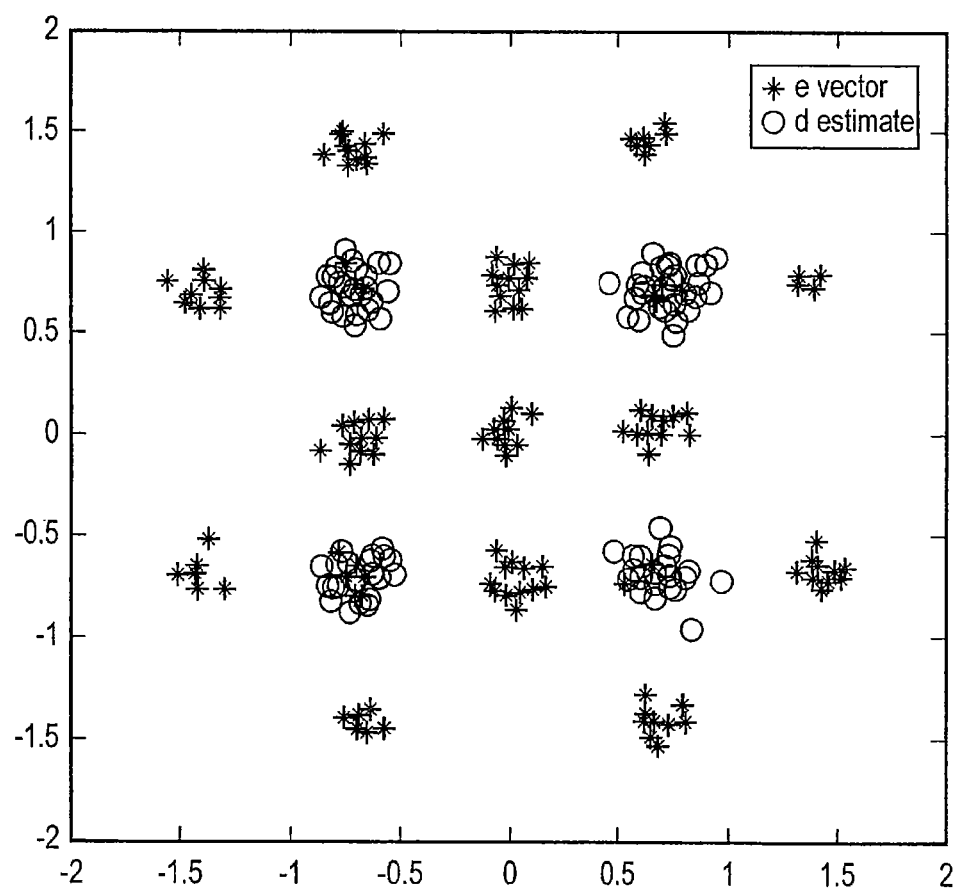
FIG. 14 Output of Channel Equalizer

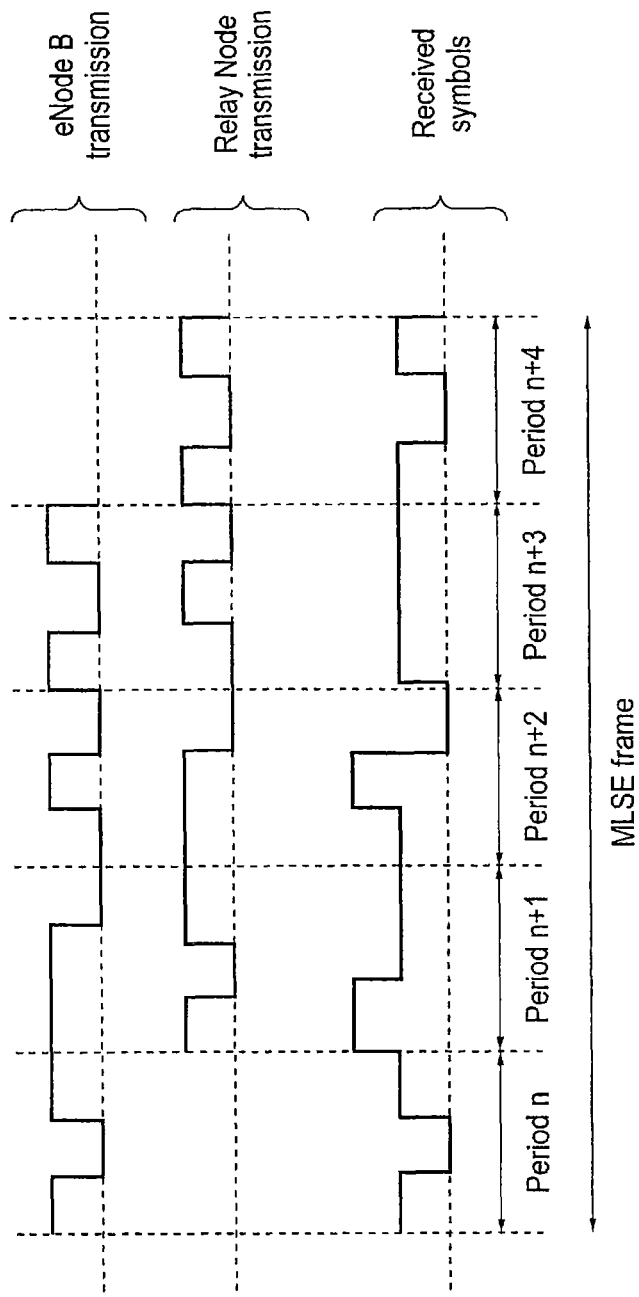
FIG. 15 Illustration of an example received symbol sequence
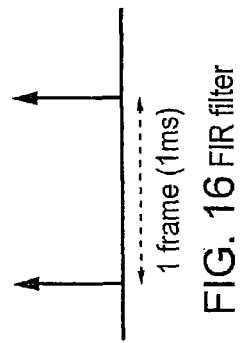
FIG. 16 FIR filter

MOBILE COMMUNICATIONS NETWORK, MOBILE COMMUNICATIONS DEVICE, RELAY NODE AND METHOD

CROSS-REFERENCE TO RELATED APPLICATIONS

The present application is a Continuation Application of International Application No. PCT/GB2012/051328 filed Jun. 12, 2012, and claims priority to British patent application 1111739.7 filed in the UK IPO on Jul. 8, 2011, the entire contents of each of which are incorporated herein by reference.

The present invention relates to mobile communications networks which are arranged to communicate data to and from mobile communications devices via a wireless access interface. The present invention also relates to mobile communications devices which communicate data with mobile radio networks, relay nodes for mobile communications networks and methods for communicating data with mobile radio networks.

BACKGROUND OF THE INVENTION

Mobile communication systems have evolved over the past ten years or so from the GSM System (Global System for Mobiles) to the 3G system and now include packet data communications as well as circuit switched communications. The third generation partnership project (3GPP) has now begun to develop a mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Multimedia Broadcast Multicast Service (MBMS) has been developed by the third generation partnership project (3GPP) to provide an arrangement in which data can be transmitted from one or more cells of a mobile radio network to mobile communications devices which have subscribed to that service. For example a television programme or multi media event can be transmitted to a plurality of mobile communications devices by contemporaneously transmitting broadcast data representing the programme or multi media event to the mobile communications devices from some or all of the base stations which form part of the network. An evolved Multimedia Broadcast Multicast Service (eMBMS) is an arrangement which is provided within the standardisation of the LTE standards within 3GPP. In particular, the eMBMS standard utilises physical layer characteristics of the LTE standard which uses Orthogonal Frequency Division Multiplexing (OFDM) on the down link to transmit the eMBMS data to mobile communication devices. A feature of OFDM is that a Fourier Transform can be used to transform the time domain received OFDM symbol into the frequency domain. This is because the signal is formed in the frequency domain and transformed using an inverse FFT into the time domain for transmission. At the receiver the time domain signal, which may have reached the receiver from multiple paths and indeed multiple sources, is transformed into the frequency domain in order to recover data symbols carried by the OFDM symbol. As such, signals representing the OFDM symbol from a plurality of different sources are combined at the receiver in a constructive way. Thus, a single frequency network can be formed for eMBMS, which can be referred to as MBSFN. Indeed the e-UTRAN system is being developed within LTE to provide for a single frequency network mode of operation in which a single frequency network can be shared with non MBMS services. Other systems which can be used to form a single frequency network include the Integrated Mobile Broadcast (IMB) system which uses Code Division Multiple Access (CDMA) to form a single frequency network. For this example a spread spectrum signal can be received and combined from different sources using a Rake receiver.

It has been proposed within LIE to use so-called relay nodes which can be disposed in a mobile radio network in order to extend a radio coverage of that mobile radio network. A relay node is an autonomous unit which receives data transmitted by a base station and re-transmits that data to mobile communications devices, which may be within the range of the relay node, but outside the range of the base station, thereby increasing the range of the base station concerned.

As will be appreciated, it is desirable to use communications resources available to a mobile radio network as efficiently as possible when providing wireless communications to mobile communications devices.

SUMMARY OF THE INVENTION

According to the present invention there is provided a mobile communications network which is arranged in operation to communicate data to mobile communications devices by transmitting and receiving data via a wireless access interface. The mobile communications network includes a plurality of base stations disposed throughout the network and arranged in operation to transmit to the mobile communications devices a broadcast signal providing a sequence of data blocks in a sequence of transmission frames, each data block of the sequence being transmitted by each of the base stations contemporaneously for each of the sequence of transmission frames. One or more relay nodes are arranged in operation to receive the broadcast signal transmitted by one of the base stations and to retransmit the broadcast signal, the broadcast signal being re-transmitted as the sequence of data blocks in the sequence of transmission frames on the same frequency as the broadcast signal transmitted by the base station, so that one or more of the mobile communications devices can receive the broadcast signal and recover the sequence of data blocks from one or both of the broadcast signal transmitted by the base station or the broadcast signal transmitted by the relay node.

It has been proposed within LTE (CMCC (R2-103960) to provide an arrangement in which a relay node receives a first signal transmitted by a base station (eNodeB) using a uni-cast bearer on a first time divided frame and in a second time divided frame the relay node and the base station are arranged to simultaneously broadcast (simul-cast) the data so that this data can be received by a mobile communications device from one or both of the signals transmitted by the relay node or the base station when the relay node and the base station are transmitting on the same frequency. Thus, the relay node and the base stations form a single frequency network. However, this proposal has a disadvantage in that essentially each of the base stations must transmit the data twice. Thus, if this arrangement were to be used to implement an MBMS system, for example, then this could potentially be wasteful of communications resources.

Embodiments of the present technique can provide an arrangement for providing a layer of relay nodes that does not require a donor base station to transmit a uni-cast signal of the data to be transmitted by the relay node before the donor base station again transmits the same data on a MBMS broadcasting channel. Furthermore embodiments of the present invention can provide a layer of one or more relay nodes which re-transmit a broadcast signal to mobile communications devices using the same time and frequency resources as those used by the base stations of the mobile communications network. As will be appreciated this provides a significant improvement in the utilisation of communications resources and furthermore eases planning and deployment of the relay nodes.

In one example, the relay node is arranged to receive each of the sequence of data blocks transmitted by one or more of the base stations and to re-transmit the sequence of data blocks as the broadcast signal. The transmission by the relay node is at the same time and the same frequency as the transmission by the one or more base stations from which the sequence of data blocks was received by the relay node and the transmission of the sequence of the data blocks by the relay node is displaced by one or more data blocks behind the transmission of the sequence of data blocks by the base station from which the sequence of data blocks was received. Furthermore in some examples the sequence of data blocks transmitted by the one or more base stations are transmitted in one or more sub-frames of each of a sequence of frames, and the relay node is configured to transmit the sequence of data blocks displaced in time with respect to the transmission of the sequence of data blocks after one transmission frame or sub-frame so that each of the data blocks received in a first transmission frame or sub-frame is transmitted in a second following frame or sub-frame.

In order to recover data from the broadcast channel, embodiments of the present invention provide mobile communications devices with a receiver which can combine the broadcast signals transmitted from the base stations in a frame n with, for example, a retransmission of the data from a relay node as a retransmitted broadcast signal in the next frame n+1. Furthermore embodiments of the present invention can provide a relay node which is arranged to receive the broadcast signals from the base station in a sub-frame at the same time as re-transmitting the broadcast signal received in the previous transmission frame in the same sub-frame. Accordingly, the relay node can be arranged to transmit the broadcast signal using the same time and frequency resources as those of the base stations. In one example the relay node is provided with a plurality of antennas to provide beam steering to receive the broadcast signal from the base station in one direction and to re-transmit the broadcast signal to the mobile communications device in a different direction. In some examples a pattern of reception and a pattern of transmission formed by the plurality of antennas may overlap, so that, as explained below a mobile communications device may receive signals from both the relay node and the donor base station and combine the signals.

Various further aspects and features of the present invention are defined in the appended claims and include a relay node, a mobile communications device and a method of communicating using a mobile communications network.

BRIEF DESCRIPTION OF THE DRAWINGS

Example embodiments of the present invention will now be described with reference to the accompanying drawings where like parts are provided with the same designations and in which:

FIG. 3 is a schematic block diagram illustrating an arrangement in which one example of a donor base station (eNodeB) and a relay node are disposed in order to support a single frequency MBMS network;

FIG. 5 is an illustrative representation of a plot of frequency with respect to time for two transmissions, a first transmission from a donor eNodeB and a second transmission from a relay node, the first and second transmissions being at the same time on the same frequency;

FIG. 8a is a schematic illustration of an OFDM transmitter and FIG. 8b is a schematic illustration of an OFDM receiver;

FIG. 10 is a schematic block diagram of a communications device adapted in accordance with the present technique to receive a transmission of MBMS data from a donor eNodeB and/or a relay node;

FIG. 11 is a schematic block diagram of a receiver forming part of the communications device shown in FIG. 10;

FIG. 13 is plot of constellation points of modulation symbols for an example signal which represents the superposition of broadcast signals transmitted respectively from a donor eNodeB and a relay node;

FIG. 14 is plot of constellation points of modulation symbols for the example signal shown in FIG. 13 after the signal has been equalised using a maximum likelihood sequence estimator;

FIG. 15 is an illustrative representation of example signal waveforms transmitted by the eNodeB and the relay node and received by a mobile communications device to explain an equalisation of signals transmitted by the eNodeB and the relay node using a zero forcing linear equaliser;

FIG. 16 is an illustrative representation of an impulse response representing a simplified channel via which a broadcast signal which has been transmitted by a donor eNodeB and transmitted a relay node is received by a mobile communications device;

DESCRIPTION OF EXAMPLE EMBODIMENTS

Figure 1:
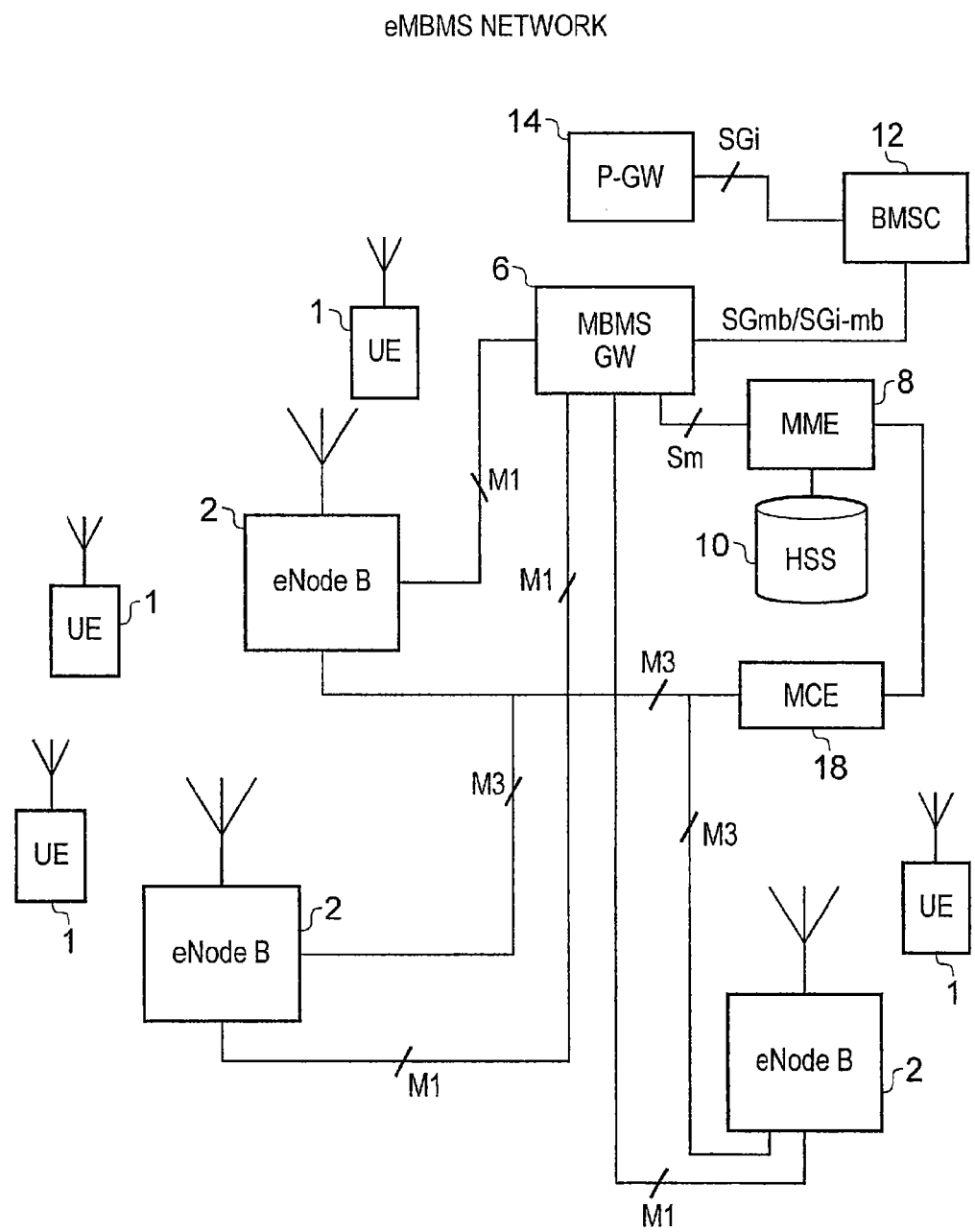
FIG. 1 is a schematic block diagram of a mobile radio network operating to support a multimedia broadcast multicast communications service.

Embodiments of the present invention will now be described with reference to an implementation which uses a mobile radio network operating in accordance with the 3GPP Long Term Evolution (LTE) standard. In the following description an example application for embodiments of the present technique will be described with respect to evolved Multimedia Broadcast Multicast Services (eMBMS) such as that which is currently being proposed for the LTE project within 3GPP. FIG. 1 provides an example architecture of an LTE network, which has been adapted to form a network for supporting a Multimedia Broadcast Multicast Service (MBMS). As shown in FIG. 1 and as with a conventional mobile radio network, mobile communications devices 1 are arranged to communicate data to and from base stations 2 which are referred to in L as evolved NodeBs (eNodeB).

The base stations or eNodeB's 2 are connected to a MBMS GW 6 which is arranged to perform routing and management of the MBMS services to the mobile communications devices 1 as they roam throughout the mobile radio network. In order to maintain mobility management and connectivity, a mobility management entity (MME) 8 manages the evolved packet service (EPS) connections with the communications devices 1 using subscriber information stored in a home subscriber server (HSS) 10. Other core network components include a Broadcast Mobile Switching Centre (BMSC) 12, a packet data network gateway (P-GW). More information may be gathered for the LTE architecture from the book entitled "*LTE for UMTS OFDM and SC-FDMA based radio access*", Holma H. and Toskala A. page 25 ff, and the MBMS which is explained in 3GPP TS 36.300 V9.4.0 (2010-06).

Also forming part of the network shown in FIG. 1 is a multicell/multicast co-ordination entity MCE 22 which is a logical entity which may be part of another entity within the eMBMS logical architecture. The MCE performs functions such as admission control and the allocation of radio resources used by all of the eNodeB's in an MBMS single frequency network for multicell MBMS transmissions using MBSFN operations. Besides the allocation of time/frequency radio resources the MCE also decides other radio configuration functions. The MBMS gateway 6 on the other hand is arranged to send broadcast data packets for the MBMS to each of the eNodeB's transmitting the service. The MBMS gateway 6 uses for example IP multicast as a means for forwarding MBMS user data to the eNodeB's.

Relay Nodes

Figure 2:
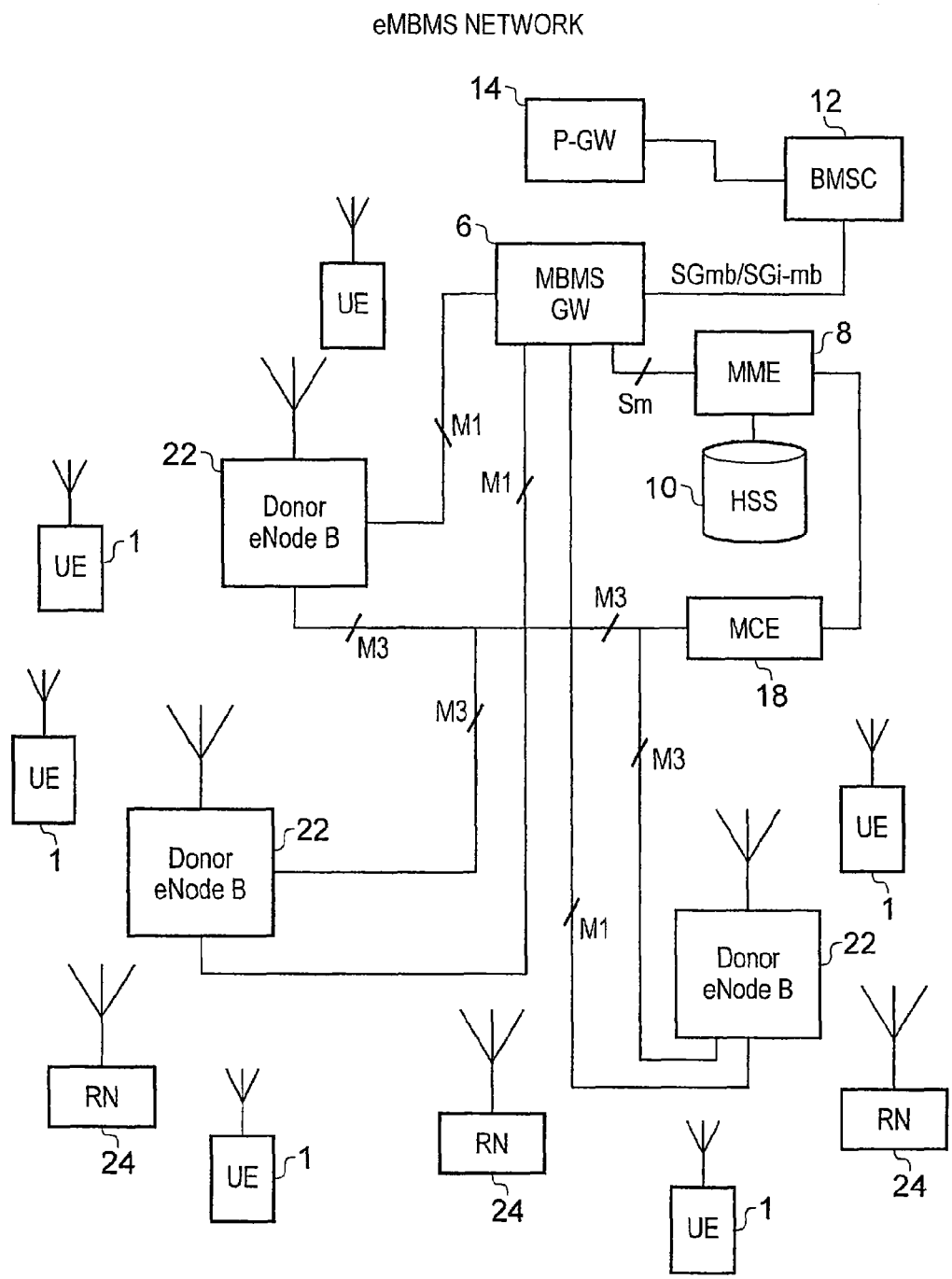
FIG. 2 is a schematic block diagram of the mobile radio network shown in FIG. 1 adapted to include a relay node.

The mobile radio network shown in FIG. 1 is shown in FIG. 2 but adapted to include relay nodes for extending the range of the eNodeB's 22. Furthermore, in accordance with the present technique some adaptation of the eNodeB 22 is required in order to support the relay node deployment. The relay nodes 24 therefore form what can be termed as a relay node layer for transmission whereas the eNodeB 22 also form a layer of transmission for communicating the MBMS data packets to the mobile communications devices 1. Thus, the layer of relay nodes is deployed in order to extend the range of communication which can be achieved with the eNodeB's alone and finds application with a transmission of broadcast data to support eMBMS although not exclusively because other services can be supported. The operation of the relay node shown in FIG. 2 can be explained more easily with reference to a simplified representation shown in FIG. 3.

In FIG. 3 data packets such as those produced by a source of MBMS data are fed from an evolved packet core network EPC 30 to an eNodeB 22. The data packets are then received by the eNodeB 22 and transmitted on a pre-determined channel which broadcasts the MBMS data packets to one or more mobile communications devices which have subscribed to receive the MBMS data packets. Thus, the eNodeB is transmitting the MBMS broadcast data on a pre-designated channel as represented by arrow 32.

As will be appreciated the range of each of the eNodeBs is limited and so mobile communications devices 1 can only receive the MBMS data within a radio coverage area which is determined by a transmission power of the eNodeB and radio propagation conditions.

In order to extend the range of communication which can be achieved by the eNodeB 22 alone, a relay node 24 is disposed within a cell of the mobile radio network served by the eNodeB. The relay node 24 is arranged to receive the data from the MBMS channel communicated by the eNodeB 22 as if the relay node 24 was itself a mobile communications device. The relay node 24 then re-transmits the data in accordance with an MBMS communication so that the broadcast data can be received by one or more communications devices 1 which have subscribed to the MBMS service.

Embodiments of the present invention have therefore been devised in order to make improvements to the support of relay nodes in a mobile communications network and in particular where the mobile communications network is supporting the communication of MBMS services.

In one known arrangement disclosed by CMCC (R2-103960), the relay node 24 is arranged to receive data from the unicast link 34 from the eNodeB 22. At this time however, the eNodeB is not broadcasting the MBMS broadcast data on the MBMS channel but simply communicating the data or a portion of that data in readiness for broadcast. At a pre-designated time perhaps at a later time slot within an OFDMA frame, both the eNodeB 22 and the relay node 24 transmit the MBMS data for reception by one or more mobile communications devices 1 within the mobile radio network. As such the re-transmission by both the relay node 24 and the eNodeB 22 can be arranged on the same frequency and same time slot thereby forming a single frequency network deployment as if the relay node 24 were itself an eNodeB. However a disadvantage is that the eNodeB 22 would have to transmit the data twice once for reception by the relay node on a unicast channel 34 and then again on a common MBMS broadcast channel 32, 38 contemporaneously with the relay node 24. Hence embodiments of the present technique seek to avoid repeated transmission of MBMS traffic by the eNodeB and to thereby make more efficient usage, of radio resources. In addition since the uni-cast transmission is not received by any of the mobile communications devices within the coverage area of the eNodeB or of the relay node, then this potentially useful information is not used to improve the probability of detection of the subsequent MBMS transmission. Hence it is also desirable to improve a probability of detection of the MBMS signal by mobile communications devices in a way that provides more efficient use of the radio spectrum.

Adapted Relay Node

Figure 4:
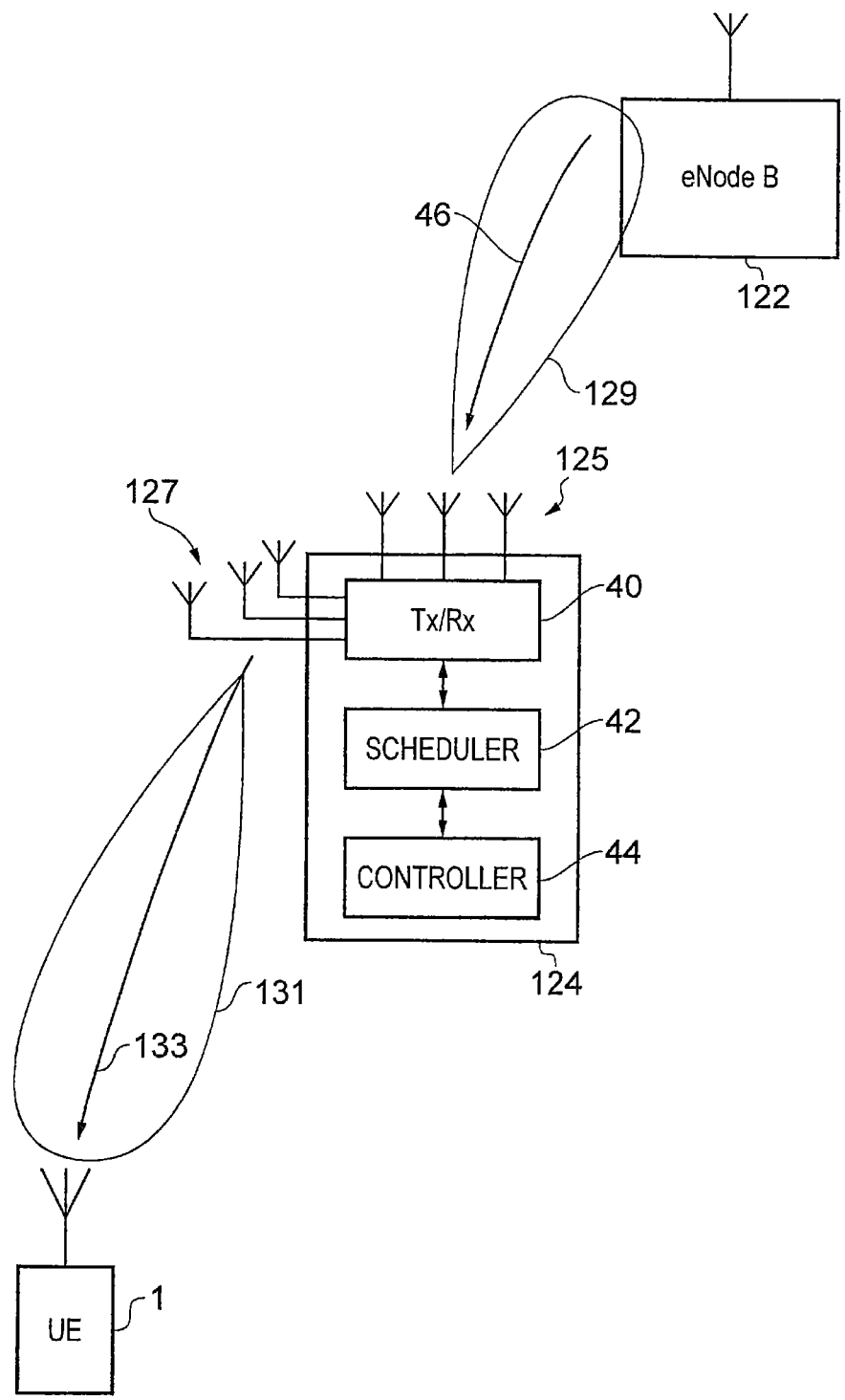
FIG. 4 is a schematic block diagram illustrating an example of a donor base station and a relay node adapted according to the present technique.

A relay node which has been adapted in accordance with the present technique is illustrated in FIG. 4. As shown in FIG. 4 a relay node 124 includes a transmitter and receiver unit 40 a scheduler 42 and a controller 44. The controller 44 is adapted to arrange for reception and transmission of data which is to be broadcast by the relay node having been received by the relay node. Thus the transmission and reception of data by the relay node 124 is made using a scheduler 42 which schedules transmission on time slots of sub-frames of a wireless access interface, such as for example, one corresponding to the LTE standard and so receives data via the LTE wireless access interface using the transceiver unit 40. The controller 44 is arranged to control the transceiver unit 40 and the scheduler 42 to perform operations required to receive the MBMS data and to transmit the MBMS data in accordance with the present technique.

As shown in FIG. 4, the relay node 124 includes in this example three antennas 125 for receiving signals from the donor eNodeB 122 on the down-link and three antennas 127 for transmitting on the down-link from the relay node 124 to a mobile communications device 2. In other examples the same set of antennas could be used for both transmission and reception. However it will be appreciated that any number of antennas could be provided in order to provide the relay node 124 with a capability to steer a beam 129 within which radio signals from a wanted source can be received, whilst transmitting radio signals to the mobile communications device 2 within a beam 131. According to known repeater technology techniques, such as careful RF design using multiple antennas 125, 127, transmitter/receiver circuit separation and echo cancelling techniques, an arrangement can be provided in which a signal 46 can be received from the donor eNodeB whilst a different signal 133 is being transmitted at the same time on the same frequency to the mobile communications device 2.

According to the present technique the relay node 124 is arranged to receive data forming part of for example an MBMS transmission from a donor eNodeB 122. Thus, transmission from the eNodeB 122 of the MBMS data is via an MBMS broadcast channel at a time t1 in each sub-frame of a plurality of frames. As will be appreciated an MBMS transmission time interval (TTI) is 1 ms, a frame is 10 ms, so that the gap between one sub-frame (1 ms) defining the end of one MBMS transmission and the start of the next may be up to 9 ms. However, this is just an example because in conventional LIE it is possible to have multiple 1 ms sub-frames carrying MEMS within a 10 ms frame. According to the present technique the relay node 124 is arranged to receive the MBMS broadcast signal 46, to detect the data transmitted from the MBMS broadcast signal using. the transceiver unit 40 in combination with the scheduler 42 and controller 44 and to re-broadcast the MBMS data. Thus the donor eNodeBs 122 can be thought of as forming a first eNodeB layer of cells and the relay nodes form a second layer of cells.

According to the present technique the transmission of MBMS traffic over MB Single Frequency Network (SFN) is made at the same time from all eNodeB's in the eNodeB layer and the same MBSFN data n is transmitted on the same frequency resources from the relay nodes one or multiple subframes later. The minimum delay between transmission from the donor eNodeB and the relay node is principally determined by the MBMS transition time interval (TTI) and a time required to receive the MBMS signal and to detect the MEMS data. This is because a time gap is necessary in order to allow the relay node to receive and decode the MBMS transmission from the eNodeB before it can transmit the data itself. Furthermore, the relay node layer and the donor eNodeB layer are arranged to transmit in the same time/ frequency resources though the content of the information being transmitted at any time will be different. This is because the transmission of the MBMS data by the relay node in one sub-frame is the data transmitted by the eNodeB in a previous sub-frame. If transmission times by the relay node and the donor eNodeB are arranged to be within the same sub-frame, then the donor eNodeB 122 and the relay node 124 will be transmitting contemporaneously, with the relay node 124 transmitting the broadcast data that was transmitted by the donor eNodeB in an earlier sub-frame.

From the point of view of the mobile communications device the transmissions from the eNodeB layer and the relay node layer are equivalent to a transmission being made from one node but with an exceptionally wide path delay profile (measured in ms). Furthermore the path delay profile will be different dependent on whether the eNodeB layer is dominant for the mobile communications device or whether the relay node layer is dominant.

FIG. 5 provides an illustrative representation of the operation of the relay node 124 in accordance with the present technique. As explained above the relay node is arranged to transmit at the same time and the same frequency as the donor eNodeB, which in one example are both transmitting data on an MBMS channel. As explained above, the relay node 124 must receive and decode the MBMS data transmitted by the donor eNodeB on the MBMS channel, and re-transmit the MBMS data after a delay. The minimum delay in the example of eMBMS corresponds to the transmission time interval (TTI) for the MBMS data. In FIG. 5, the difference between times for signals Sb,1 and Sr,1 would be approximately equal to the frame duration although the transmission times for signals Sb,2 and Sr,1 are at the same time and the same frequency. Accordingly, if the MBMS data is transmitted in blocks of data n, with each MBMS data block n corresponding to the amount of MEMS data which can be transmitted in one sub-frame, then the transmission by the eNodeB layer and the transmission by the relay node layer will be at the same time on the same frequency, but the relay node will be transmitting data block n−1 which will have been transmitted one frame earlier by the eNodeB. Thus the relay node layer will be transmitting at the same time but one MBMS block behind that of the eNodeB. This arrangement is shown in FIG. 5 which presents as a first plot, transmission power with respect to time 100 for a plurality of sub frames 102 from the donor eNodeB transmitting MBMS data as a transmission block 104, which is occurring at the same time as the transmission block 106 transmitted by the relay node shown by a second plot 108. Thus, in accordance with the present technique the controller 44 within the relay node 124 controls the scheduler and the transceiver unit 40 to receive the MBMS data n transmitted by the donor eNode B 122 on the downlink 104 whilst at the same time transmitting data in the same sub-frame 106. However, the data transmitted in the subframe 106 is the content of the downlink transmission from the eNodeB from one frame before that transmission. In another embodiment, where every 1 ms subframe within a 10 ms frame is allocated for use in transmitting MBMS data it is not necessary for the relay node to wait for the next (10 ms)

frame before re-broadcasting the MBMS data. Rather the relay node could re-transmit the data as early as the following 1 ms sub-frame.

As will be appreciated from the above explanation, embodiments of the present technique can provide an arrangement for providing a layer of relay nodes but does not require the donor eNode B 122 to transmit a uni-cast signal of the MBMS data to be transmitted by the relay node before the donor eNode B again transmits the same data on a MBMS broadcast channel. As mentioned above, a disadvantage of prior art approaches is that the MBMS traffic is transmitted twice by the eNodeB, once in the uni-cast transmission to the relay node and secondly when the eNodeB makes the MBMS broadcast itself. This repeated transmission has the disadvantage that it consumes additional eNodeB radio resources. This solution avoids the repeated transmission from the donor eNodeB yet still enables combining of MBMS signals from both relay nodes and donor eNodeB's to be achieved.

Figure 6A:
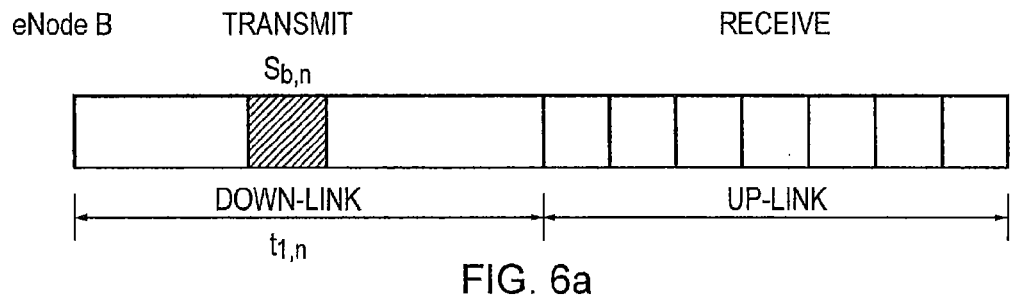
FIG. 6a is an illustrative representation of a time division duplex frame structure used by a base station operating in accordance with an LTE system (which supports both FDD and TDD)
Figure 6B:
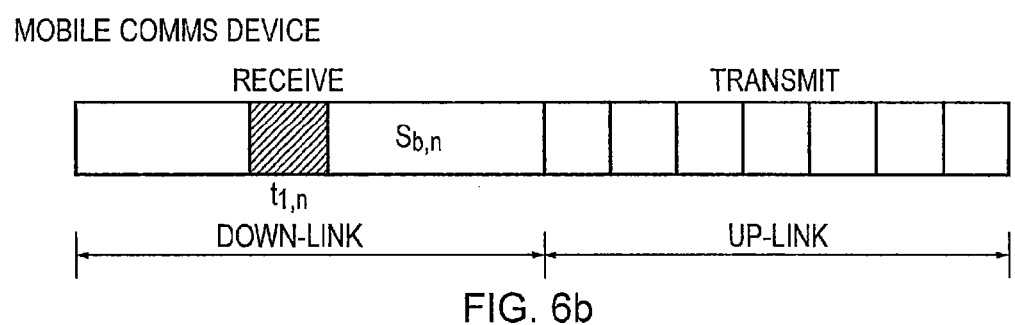
FIG. 6b is a corresponding time division duplex structure of a mobile communications device.
Figure 6C:
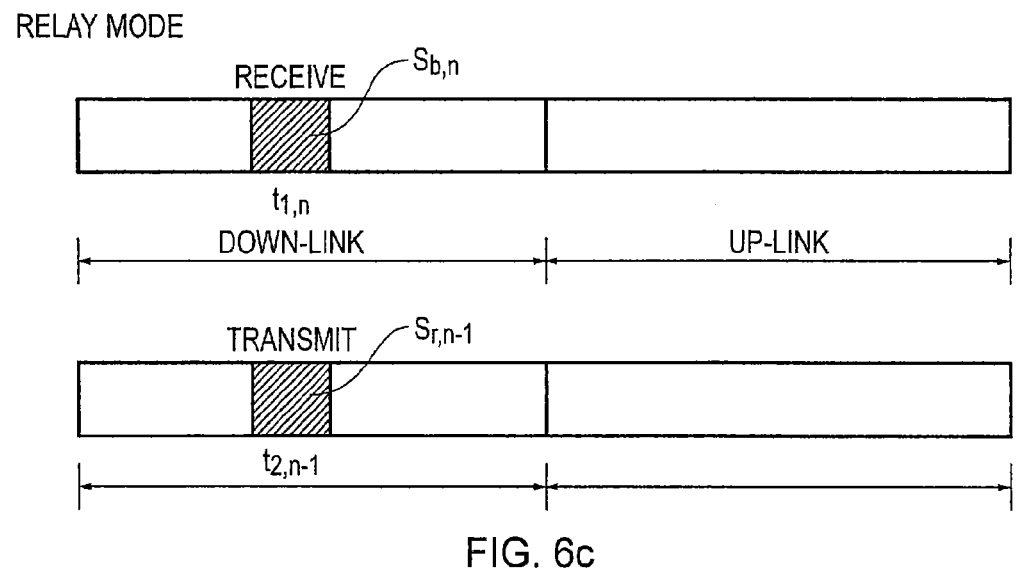
FIG. 6c is a corresponding time division duplex structure of a relay node in accordance with the present technique.
Figure 7A:
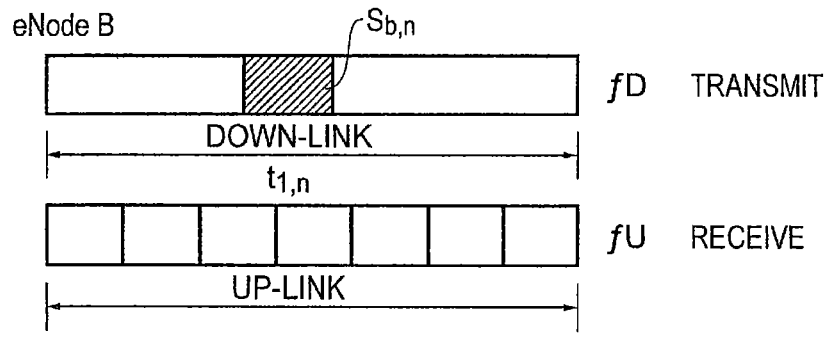
FIG. 7a is an illustrative representation of a frequency division duplex frame structure used by a base station operating in accordance with a 3G system.
Figure 7B:
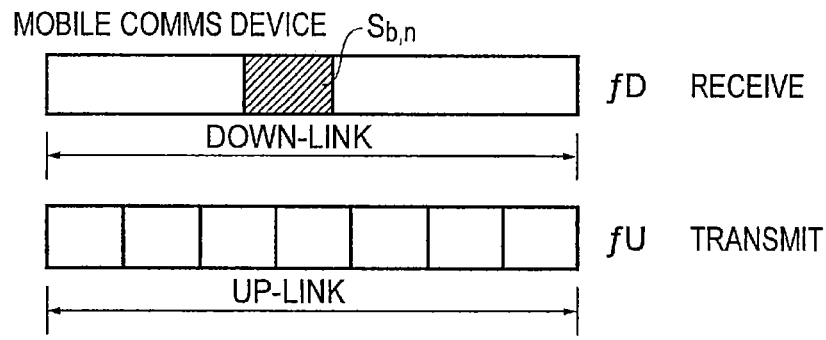
FIG. 7b is a corresponding frequency division duplex structure of a mobile communications device.
Figure 7C:
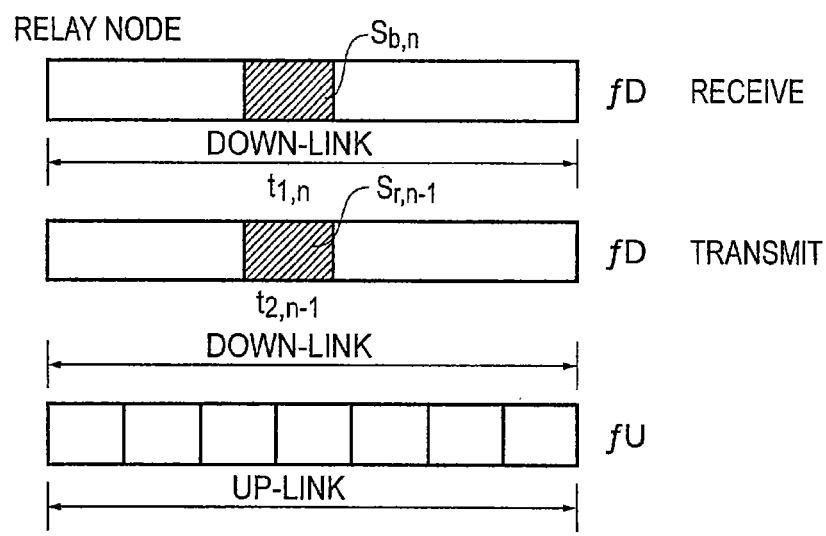
FIG. 7c is a corresponding frequency division duplex structure of a relay node in accordance with the present technique.

Furthermore, embodiments of the present technique can provide a relay node, which is arranged to receive an MBMS signal Sb,n at the time slot t1,n and re-transmit the data from that MBMS signal Sb,n in the next frame at a time t2,n as a signal Sr,n. At the same time the relay node is arranged to receive the next MBMS signal Sb,n+1, whilst the relay node is transmitting the signal Sr,n, because t,1n+1=t2,n. This is because as explained above the eNodeB and the relay node transmit at the same time and on the same frequency. This arrangement is illustrated in FIGS. 6*a*, 6*b* and 6*c* for a time division duplex scheme such as that which may be used for LTE, and corresponding FIGS. 7*a*, 7*b* and 7*c* for a frequency division duplex scheme such as that which also may be used in LTE. As can be seen for the examples of FIGS. 6*a* and 7*a*, the eNodeB transmits the MBMS signal Sb,n on the down-link, which is received on the down link by the mobile communications device and the relay node in FIGS. 6*b*, 7*b* and 6*c*, 7*c*. As can be seen in FIGS. 6*a*, 6*b* and 6*c*, for the example of TDD, the transmission on the up-link by the mobile communications device occurs on the same frequency as the down-link, but within a different part of the frame. Correspondingly, in FIGS. 7*a*, 7*b* and 7*c* for the example of FDD the transmission on the up-link by the mobile communications device occurs on a different frequency as the down-link. However more significantly for both TDD and FDD modes, the relay node must transmit and receive on the down-link at the same time, because the relay node must receive the transmission from the eNodeB Sb,n+1 on the down-link at the same time that the relay node transmits on the down-link at the same time and the same frequency Sr,n.

Embodiments of the present invention can utilise various techniques such as echo cancellation or beam steering to provide an arrangement in which the relay node can both receive on the down-link a signal from the donor eNodeB and transmit on the down-link to the mobile communications device (UE). In some examples a relay node can be provided with a plurality of antennas which can be used to faun a beam of coherently transmitting radio signals in one direction whilst receiving radio signals in another direction. This example is shown in FIG. 4 and as explained above, the relay node 124 is provided with a plurality of receive antennas 125 and a plurality of transmit antennas 127 in order to employ beam steering to allow the relay node to receive on the down-link from the donor eNodeB 122, whilst transmitting on the down-link to the mobile communications device 2. Those acquainted with radio communications will be familiar with such techniques and so no further explanation is provided here. Accordingly the use of a plurality of antennas to form sectors for the transmission and reception of radio signals will allow the relay node to receive from the donor eNodeB on the down-link at the same time as transmitting to the mobile communications device on the down-link. However, advantageously the transmit and receive antenna beams may be arranged to over-lap so that a mobile communications device can receive and combine signals transmitted by both the donor Node B and the relay node as explained below.

Adapted Communications Device

As will be appreciated from the explanation above, to detect and to recover the MBMS data a mobile communications device according to the present technique is arranged to receive the signals representing the data transmitted by the donor eNodeB 122 as signal Sb,n at time t2,n and the data transmitted by the relay node 124 as a signal Sr,n at time t2,n and to recover the MBMS data blocks n from one or both of the signals Sbn, Srn during reception. Thus, the mobile communications device 1 is adapted to include a receiver which performs a reception technique which recovers the data from the donor eNodeB at time t2,n and the relay node at time t2,n. In one example the radio access interface is implemented in accordance with the LTE standard and therefore employs OFDM, although as explained shortly, in other examples, the wireless access interface in 3G is W-CDMA, which can also be employed. In order to better understand the reception of data by a mobile communications device from the eNodeB and the relay node, a brief explanation of an OFDM transmitter and receiver will now be described with reference to FIGS. 8*a* and 8*b*.

FIG. 8*a* provides a block diagram of a simplified representation of an OFDM transmitter. In FIG. 8*a* data to be transmitted is received on an input terminal 60 and mapped onto a plurality of constellation points for each of a plurality of narrow band transmission channels by a serial to a parallel converter 62 and a constellation mapper 64. An inverse Fast Fourier Transform (FFT) 66 then converts the set of narrow band carriers into the time domain which is then up converted and modulated for RF transmission by an RF front end 68 and transmitted from an aerial 70.

On the receiver side FIG. 8*b* includes a receive antenna 72 and an RF front end and down converter 74 for transforming the received OFDM symbol to a base band form. The real and imaginary components of the OFDM symbol which are converted by the RF front end 74 into the discrete time domain is then transformed from the time domain into the frequency domain by an FFT 76. A symbol decoder/detector 78 then converts the frequency domain data providing a symbol on each of the narrow band carriers at an output of the FFT 80. For each of the symbols provided on the narrow band carriers an estimate of the data is fed to a parallel to serial converter 82, which is then output on an output channel 84 which provides an estimate of the originally transmitted data. The symbol decoder/detector 78 also typically includes an equaliser, which equalises the received base band frequency domain signal from the FFT 76 before the data symbols are recovered from the sub-carriers of the OFDM symbol.

Within the decoder/detector 78 it is necessary to demodulate each of these narrowband transmissions of each of the carriers of the OFDM signal. This is conventionally achieved using the FFT 76. The output of the FFT 76 will be a set of (Re, Im:2 dimensional) vectors $Y_0$ thru $Y_{N-1}$. In simple terms, these vectors will be the same as the original input vectors $X_0$ thru $X_{N-1}$ but with a frequency specific magnitude reduction and phase shift brought about by the effect of the channel. The channel will also introduce some dispersion. Since the symbol duration of the LTE symbol is much greater than the channel delay response, this dispersion is 'absorbed' in the cyclic prefix or guard period (not shown in the above figures).

Equalisation in the conventional LTE systems can in one example involve rotating and amplifying the received vectors Y in order to remove the effect of the attenuation and phase shift which was introduced by the channel at that given frequency. Once this equalisation has been performed the symbol can be detected.

As mentioned above a property of OFDM allows signals received contemporaneously from different sources to be combined during reception. Thus, a receiver of an OFDM signal in the mobile communications device will receive the signal transmitted from two transmitters, which will appear as if a single signal had reached the receiver from a single transmitter but via different paths. This therefore corresponds to a single frequency network example. Provided the base site and the relay node sub-frame timing is aligned and provided propagation delays are less than the cyclic prefix period of repeated data samples of the OFDM symbol and the window of time domain samples for the FFT is synchronised to capture as much of the energy of the received signal as possible from the different transmission paths, then the FFT can recover data from a combination of the transmission paths.

Figure 9A:
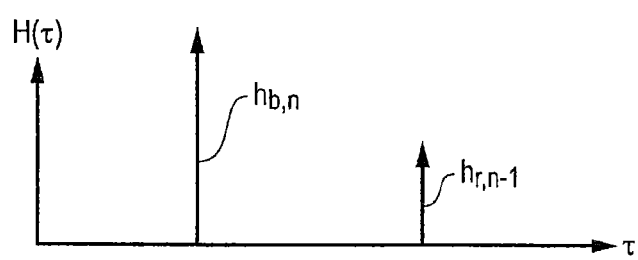
FIG. 9a is a schematic illustration of the effective multi-path profile as seen at a receiver of an OFDM signal in which a first signal path hb,n has a greater gain than a second signal path hr,n−1.
Figure 9B:
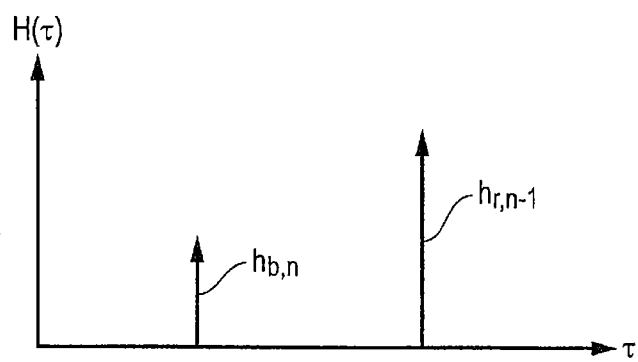
FIG. 9b is the multi-path profile of FIG. 9a in which the signal gain of the first path hb,n is lower than the second path hr,n−1.

In accordance with the present technique the mobile communication device includes a receiver adapted to combine the signals received from both the relay node and the donor eNode B. From the point of view of the receiver in the mobile communications device the effect of the relay node re-transmitting the signal received from the eNode B in a later sub-frame is equivalent to a single transmission $S_{b,n}$ having been made from the eNodeB where that transmission is convolved with an effective channel impulse response, examples of which are shown in FIGS. 9a and 9b. The delay between the two paths shown in the FIGS. 9a and 9b is unusually large since it is predominantly determined by the delay between the eNodeB transmitting the signal and the relay node re-transmitting the same signal in a later sub-frame. The relative magnitudes of the channel gains on each path will depend on the particular radio link qualities from eNode B to mobile device and from relay node to the mobile device. Therefore as illustrated in FIGS. 9a and 9b a relative strength of the two paths may vary. In FIG. 9a the signal path from the donor eNode B $h_{b,n}$ has a stronger amplitude than the second signal $h_{r,n-1}$ transmitted by the relay node. The converse is true of the situation illustrated in FIG. 9b.

One aspect of the invention is therefore that equalisation/path combining concepts are utilised in order to allow both the relay node layer and the eNodeB layer to transmit using the same frequency resources and without duplicate transmission of information by the donor eNodeB. As explained above, signals are transmitted at the same time and the same frequency. However, if the mobile communications device is close to the relay node $S_{r,n}$, then it could receive the MBMS signal from the relay node only, or if the mobile communications device is close to the eNodeB. it could correspondingly receive the MBMS data from the eNodeB only. Accordingly in this example the receiver would select one or the other signals based on the relative strengths of the signal paths $S_{b,n}$ $S_{r,n}$ as illustrated in FIGS. 9a and 9b. Alternatively the mobile communications device could receive and combine the signal from the relay node $S_{r,n}$ with the signal $S_{b,n}$ from the eNodeB, the latter of which would have been transmitted in an earlier subframe than the former.

A mobile communications device 101 adapted to receive data transmitted by both the donor eNodeB 122 and the relay node 124 shown in FIG. 10 includes a transceiver unit 104 a controller 106 and an applications processor 108. The controller 105 controls the transceiver unit 104 to transmit and receive data to and from the transceiver unit 40 of either the relay node or the donor eNodeB 124 to support a communications service provided for example by an applications program executing on the processor 108, which for the present example is receiving an eMBMS service.

For the present example, the controller 108 controls the transceiver unit 104 to receive both the first version of the broadcast data provided by a first signal $S_{b,n}$ on time $t_{1,n}$ and the second version of the broadcast data provided by a second signal $S_{r,n}$ at a different time $t_{2,n}$ as illustrated in FIGS. 9a and 9b. These signals are received as mutually interfering signals and so the transceiver unit 104 is adapted to receive and to recover the data from the first and second signals $S_{b,n}$, $S_{r,n}$.

One example of a receiver forming part of the transceiver unit 104 is shown in FIG. 11 with parts corresponding to the receiver shown in FIG. 9b having the same reference designations. In accordance with a general explanation of the operation of an OFDM system given above with reference to FIG. 8b, in FIG. 11 the OFDM signals received from the antenna 72 are passed to the RF front end and down converter 74a and fed to a path detector 100.

As will be appreciated there are various techniques which can be employed to detect and recover the data transmitted by the eNodeB and the relay node, which may depend on a transmission technique being utilised to form the wireless access interface. However, for the example shown in FIG. 11, the communication technique is OFDM. As such the path detector 200 is arranged to resolve the transmission paths via which the signal, which is a combination of the signal transmitted by the eNodeB $S_{b,n}$ and the signal transmitted by the relay node $S_{r,n}$. This is achieved using the pilot symbols transmitted in certain time/frequency resource elements. As indicated above, provided the difference in any offset in time of arrival of $S_{b,n}$ and $S_{r,n-1}$ added to any propagation dispersion falls within the cyclic prefix interval then the FFT can recover the data transmitted from the relay node and the eNodeB. However to this end the path detector is arranged to detect the transmission paths and to centre a time window for performing the forward FFT to transform the received signals into the frequency domain. An output of the FFT processor 202 feeds a decoder/detector 78 which performs the operation of the symbol detector 76 shown in FIG. 8b.

Example techniques for detecting and recovering the data from signals received by the mobile communications device transmitted by the donor eNodeB and the relay node are provided in the following sections:

Signal Path Equalisation

As mentioned above, MBMS transmissions in LTE are only allowed in a selected number of the 10×1 ms sub-frames per frame. According to one example, the transmissions from the relay node layer and from the donor eNodeB layer are time synchronised as shown in FIG. 5 mentioned above. Providing that the transmissions are time synchronised to the OFDM symbol boundaries, then the impact of the donor eNodeB and the relay node transmitting at the same time $t_{1,n}$ and $t_{2,n-1}$ and on the same frequency resource will be that each output vector Y from the FFT will consist of the superposition of two vectors. One of these vectors will correspond to the symbol transmitted from the donor eNodeB $S_{b,n}$ with a rotation and attenuation given by that of the channel response between donor eNodeB and mobile communications device. The other of these vectors will correspond to the symbol transmitted from the relay node with a rotation and attenuation given by that of the channel response between relay node and mobile communications device. According to the example receiver shown in FIG. 12, an equaliser can be employed to reduce the inter-symbol interference caused by the combination of the signals received from the eNodeB and the relay node. As for the example receiver shown in FIG. 12, a path detector 200 can be used to provide a coarse estimate of the different paths via which the signals are received, using for example pilot symbols transmitted within certain time/frequency resource elements. The coarse estimate can be used to synchronise a time window for collecting samples for the FFT, before converting the time domain samples into the frequency domain. Equalisation can then be performed in the frequency domain by the detector 204. The receiver in the mobile communications device can make use of the pilot symbols transmitted by the donor eNodeB's and Relay Node's to estimate the communications channel from each layer and then an equaliser 204 can use various equalisation techniques to reduce or remove the inter-symbol interference. Examples include a Decision Feedback Equaliser (DFE). In the DFE scheme, once a decision has been made on what symbol was transmitted then, using knowledge of the channel response, the inter-symbol interference which results from this symbol can be removed before attempting to detect later symbols. The alignment of sub-frames at the mobile communications device received from each transmitter are approximately the same, with any timing misalignment falling within the bounds of the guard interval.

Therefore the output of the FFT processor 202 will provide a combined frequency domain signal from which the data can be recovered using conventional equalisation. For the example of a decision feedback equaliser, the path detector 200 can utilise a training sequence or pilot symbols in certain time, frequency resource elements transmitted from both the eNodeB's and the relay nodes. Thus if the same training sequences is transmitted in the first and second signals then using known techniques the path detector can identify the path profile illustrated in FIGS. 9a and 9b to identify which is the stronger and the weaker paths from the relay node and the donor eNode B.

Zero Forcing Linear Equalizer

Figure 12:
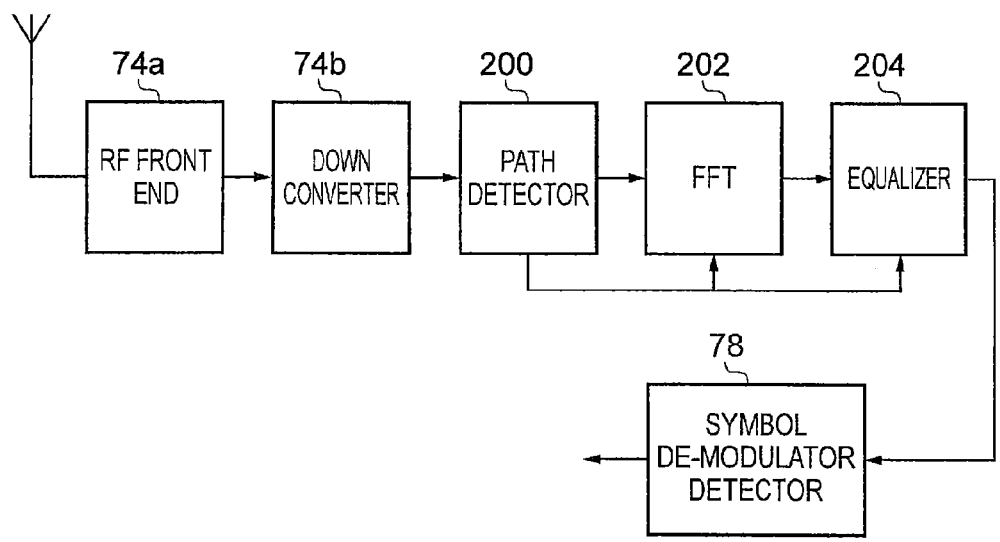
FIG. 12 is a schematic block diagram of another example receiver forming part of the communications device shown in FIG. 10.

In another approach, the equaliser 204 of FIG. 12 is arranged in operation to recover the symbols streams received from the donor eNodeB and the relay node and to receive the MBMS data using for example a zero forcing linear equalizer. To illustrate this example technique, let us assume that the composite channel impulse response per sub-carrier of an OFDM symbol as observed at the mobile communications device can be expressed as:

$$h=(h_1,h_2,\ldots,h_W)$$

Each element of the impulse response corresponds to a sampling instant at the modulation symbol rate (post FFT), and the length of the impulse response is defined by W. The received vector at the UE is given by $$e=Hd+n$$

where H is a (N+W−1)×N matrix, whose column vectors are the composite channel impulse response shifted on a per row basis. The vector d is a column vector of length N and has complex elements that correspond to the modulation symbols. The vector n has complex elements that correspond to Gaussian noise perturbation, the length of n is (N+W−1).

For a zero forcing (ZF) linear equalizer we can write the estimate of the modulation symbols as $$\hat{d}=(H^{*T}H)^{-1}H^{*T}e=(H^{*T}H)^{-1}H^{*T}Hd+(H^{*T}H)-1H^{*T}{}_n$$

In LTE, for each 0.5 ms slot 7 OFDMA symbols are produced, so in a 10 ms radio frame we have a maximum of N being equal to 140modulation symbols per sub-carrier. Assuming the channel from the relay node and donor eNodeB are uncorrelated and suppose the channel spans lens, then the number of elements W=28. The relay node transmits with a delay of 1 ms and so we can write the composite channel impulse response as $$h=(_{DeNB},0,0,0,0,0,0,0,0,0,0,0,0,0,h_{RN},0,0,0,0,0,0,0,0,\\0,0,0,0,0)$$

For example, with N=140, W=14, $h_{RN}=0.5+j0.5$, $h_{DeNB}=-j$ and SNR=6 dB, the transmitted vector from the donor eNodeB and the relay node and the received vector at the mobile communications device are shown below in FIG. 13. The disturbance from the composite channel impulse response and noise can be seen from FIG. 13.

In FIG. 14 the output of the zero forcing linear equalizer is shown, for which the influence of the composite channel impulse response has been removed. The constellation points for the data estimate are perturbed by noise, which is normal for this type of process. Accordingly the delayed transmissions from a relay node combined with a donor eNodeB transmission may be treated as a channel equalization problem. Constellation points before equalisation are shown as crosses and constellation points after equalisation points are shown as circles.

Maximum Likelihood Equaliser

In another example the equaliser 204 is implemented using a maximum likelihood sequence estimator, which seeks to improve its probability of detection not by cancelling 'interference' but by determining the most probable superposition of symbols using a maximum likelihood sequence estimation, which is a known equalisation technique for a sequence of symbols which are affected by inter-symbol interference. An example of this technique is presented in the following paragraphs with reference to FIGS. 15 and 16.

FIG. 15 provides an illustration of interfering signals received by a mobile communications device from a donor eNodeB and a relay node. In this example, it is assumed that in each 1 ms frame (denoted a 'Period') only three OFDM symbols are transmitted (reduced number of symbols for illustration purposes) and that these symbols can take the value 0 or 1 (no complex symbols are shown for the sake of clarity) and only one OFDM (narrowband) sub-carrier is considered. In this example, the 'transmit sequence' is assumed to last for four frames (4×1 ms=4 ms). However, the receiver detects the underlying transmit sequence based on five frames (5 ms) of buffered receive data. This means that every fifth frame which is transmitted by the base site and every fifth frame which is transmitted by the relay node is blank as shown in FIG. 15. The group of five frames are referred to in the following description as an 'MLSE frame'. In this illustration, to explain the principle of operation it is assumed that the channel introduces no attenuation or phase shift.

Hence, with reference to FIG. 5, by adding the transmission from the eNodeB to the transmission from the relay node the receive symbol sequence (MLSE frame) can be determined by the receiver. In this example, the actual transmit sequence is: 1,0,1,1,1,0,0,1,0,1,0,1. The objective of the receive decoder is to determine the most likely transmit sequence based on the restricted information which is available to it, that information being:

The received symbol sequence, which in this example, in the absence of noise would be: 1,0,1,2,1,1,1,2,0,1,1,1, 1,0,1

Knowledge of the 'channel' (in the case of this simple example the channel is a finite impulse response filter with two unit impulses (ie amplitude 1) which are separated by one frame, see figure below. This impulse response would be determined by the receiver in practice through the use of pilot transmissions allied to a priori known knowledge that the relay node always transmits the same data as the base site but with 1 ms delay.

A brute force decoder would take every possible transmit sequence as 'candidate transmit sequences', for example:
0,0,0,0,0,0,0,0,0,0,0,0
0,0,0,0,0,0,0,0,0,0,0,1
0,0,0,0,0,0,0,0,0,0,1,0 . . .
1,1,1,1,1,1,1,1,1,1,1,1, For each of these, the 'candidate transmit sequence' would be passed through the finite impulse response (FIR) filter as illustrated in FIG. 16, to obtain a 'candidate received sequence'. The mean square error between the candidate received sequence and the actual receive sequence would then be determined (this might simply be the mean of the square error measured across all the symbols). The 'candidate transmit sequence' which has the lowest mean square error would then be determined to be the most likely transmit sequence. The following observations can be made about this technique for equalizing the signals transmitted by the donor eNodeB and the relay node:

As much energy as possible (interference) is usefully applied in coming to the best possible decision about the likely original transmit sequence.

It should be evident that the same concept can be applied if the symbols are complex It should be evident that the same approach can be used if the transmission from the base site introduces attenuation and phase shift and likewise if the transmission from the relay node introduces (a different) attenuation and phase shift. In this case pilot symbols would be used to determine the attenuation and phase shift, and the FIR filter (used in computing the 'candidate receive sequences') adapted accordingly (ie. The FIR filter would have 2 complex and different impulses).

The summation of say +1 symbol (from BS) and a −1 (from RN)=0 as does −1 (from BS) and +1 (from RN). So there could be some ambiguity if trying to make a symbol by symbol detection, however, the objective is to make the best possible estimate of the entire sequence here. In this regard the method is easily extensible to the case where a forward error correction code, for example a convolutional code has been applied. In this case the 'transmit sequence' would include redundancy bits and a consequence of the channel coding would be that only a subset of all possible transmit symbol sequences (bit combinations) are actually valid (ie. are valid codewords). This can be used to combat the ambiguity which would result if trying to detect on a symbol by symbol basis.

Practical implementations would not do a brute force comparison for every possible transmit sequence combination, rather it is expected that a more computationally efficient algorithm for example based on trellis/Viterbi like techniques would be used.

Since TV channels do not need to be received in real time, an MLSE frame lasting say 20 (1 ms frames) corresponding to 20 ms (or even longer), would be viable (with 5% blank frames). So the periodic lack of transmission would not cause too much overhead (in the example every $5^{th}$ frame was blank).

The relay node itself receives and decodes each MBMS frame transmitted by the eNodeB every 1 ms (ie it does not have to wait for an MLSE frame, for the avoidance of doubt the MLSE frame concept is only relevant from the UE perspective).

The receive sequence shown in FIG. 15 is also given by the convolution of the eNodeB transmit sequence with the FIR response shown in FIG. 16.

Signal Selection

In another implementation the path detector outputs a channel profile to the equaliser 204, FIG. 12 which is arranged to select one or the other of the first and second signals Sb,n and Sr,n, depending on which signal has the strongest power, as illustrated in FIGS. 9a and 9b. For this example, the weaker of the signals from either the relay node or the donor eNodeB would represent interference to the wanted signal. The receiver in the mobile communications device can make use of pilot symbols transmitted by the donor eNodeB's and Relay Node's to estimate the communications channel from each layer and then is the strongest, the mobile communications device can detect the transmission from the strongest layer and treat the signal from the other layer as interference. Thus the equaliser detects the strongest signal from either the relay node or the donor eNodeB and recovers the data from the strongest signal having corrected for any phase shift and attenuation that has been experienced on the selected strongest path.

Implementation Detail for the IMB system

A further example, which can be employed relates to the Integrated Mobile Broadcast (IMB) system which makes use of Code Division Multiple Access (CDMA). For this example the signals Sb,n and Sr,n may be transmitted using CDMA and a detector may include a rake receiver which is adapted to provide a rake finger at each of the transmission path times t1,n and t2,n for the signals Sb,n and Sr,n respectively in order to recover the data block n.

Figure 17:
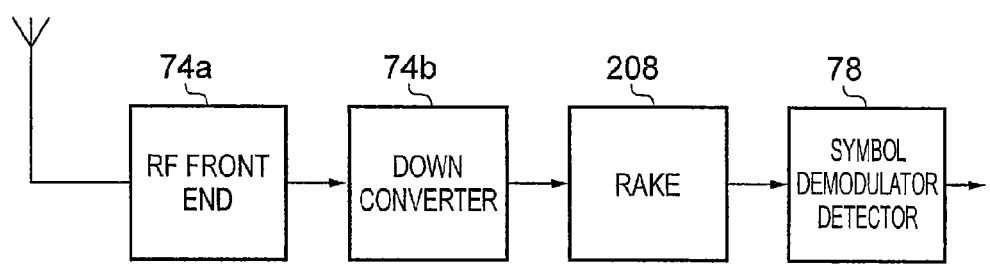
FIG. 17 is a schematic block diagram of another example receiver forming part of the communications device shown in FIG. 10.

For the example of CDMA a receiver according to the present technique can use either equalisers or a rake receiver 208 as illustrated in FIG. 17 in order to deal with inter-symbol interference, which as explained above results from the transmission of the wanted signal from the relay node and the eNodeB at times t1 and t2 (Sb,n and Sr,n). In CDMA the chip period is often designed to be much less than the delay experienced between different significant paths. Also there is very little auto-correlation between successive chips. This makes it possible to design a receiver which can detect the transmissions on multiple separate channel impulse response paths. Therefore an equaliser or a rake receiver can be arranged to detect and to combine the first and the second signals Sb,n, Sr,n. The energy on each of these separate paths can be collected and used to improve the probability of correct detection. The rake approach contrasts with possible alternative techniques where the signals received on secondary paths are treated as interference and are removed prior to detection.

In the rake receiver 208 design the mobile communications device determines the channel impulse response by making measurements on a pilot channel. In the rake receiver N correlators are provided, each correlator is associated with one of the N most significant paths in the channel impulse response. Each correlator has a delay imposed on the multiplying channelisation code, where the delay corresponds to the delay for the given channel response path. The outputs of the correlators are then weighted according to the power or signal to noise ratio from each correlator output. The output of the summation is then used in the detection.

In the case where the same IMB transmissions are made from the relay node and donor eNodeB at significantly different times (ie delay>MBMS TTI), then this rake receiver technique can be employed. Each of the significant paths from the relay node layer to the mobile communications device and from the donor eNodeB(s) to the mobile communications device can be individually received and combined in the rake receiver. As will be appreciated, many IMB receivers make use of equalisers in preference to rake receivers, so that a receiver could employ a combination of the elements shown in FIGS. 11, 12, and 17.

Other Example Embodiments

In another example the relay node, can be provided with a receiver with interference cancellation techniques and/or multiple antennas in order to more reliably receive the initial MBMS transmission from the eNodeB. In addition, other techniques can be employed for improving the reliability of detection of the MEMS signal at the relay node. Reliable detection at the relay node is important since the relay node will be relaying the MBMS information to multiple mobile communications devices. For example the relay node may use echo cancellation techniques which serve to identify echoes of its own transmissions and to cancel these echoes in order to detect the signal transmitted by the eNodeB. This is a known technique in physical layer repeater technology, which aims to allow the reception of a low power signal in the presence of a high power signal. Analogue or digital signalling processing techniques may be used to attenuate any echoes (interference) which does occur, using echo cancelling technologies.

Figure 18:
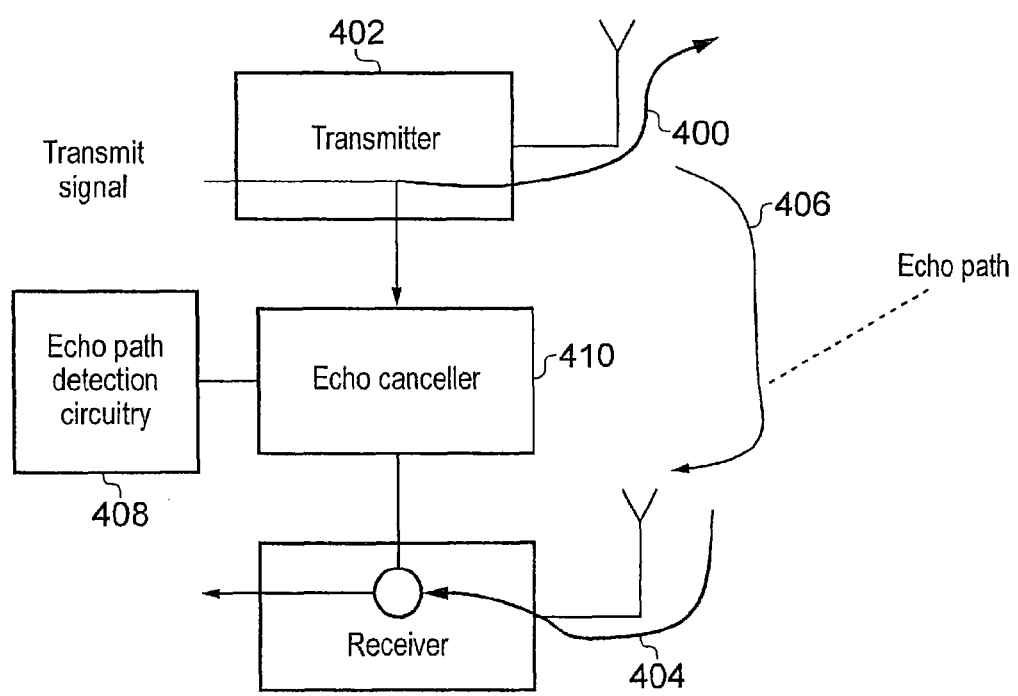
FIG. 18 is a schematic block diagram of a relay node configured to cancel an echo of a signal transmitted by itself.

As illustrated by the example shown in FIG. 18, these technologies work by first determining the echo path profile, for example through the use of training signals and then given that the transmit signal is known, the inverse of the echo can be computed which is then added to the receive signal so as to cancel the echo. Thus as shown in FIG. 18, a signal 400 transmitted by a transmitter 402 is received 404 at a receiver in the relay node hi the presence of an echo signal 406. However, using a training sequence which is present in the transmitted signal 406 an echo path detection circuit can detect the echoed signal 406 and an echo canceller 410 can cancel the echoed signal from the received signal 404.

The low power signal can then be amplified (and possibly tidied up) before re-transmitting the signal again at high power. This operation may occur at different levels within the design, for example the repeater could receive an analogue signal it could then amplify the analogue signal and re-transmit it. Alternatively it could involve detection of a digital signal, which is then re-encoded and transmitted (such a repeater would be said to have 'tidied up' the signal before re-transmitting it).

The detection of a low power transmission in the presence of a high power interfering echo can be achieved to some extent by appropriate RF and antenna design, so for example separate antennas may be used for transmission and reception, which is a technique mentioned above to allow the relay node to detect the signal transmitted by the donor eNodeB whilst transmitting a repeated signal to the mobile communications device. The antennas may be designed to have directional antenna gains, which are arranged so as to overlap as little as possible. So for example the receive antenna may point in one direction, toward the donor eNodeB, whilst the transmit antenna may point in another direction, away from the donor eNodeB. Different polarisation might be used on each antenna.

Embodiments of the present invention can provide a daisy chain of relay nodes which may be attached to a single eNodeB. Where there are n relay nodes in a daisy chain then there will be n+1 separate 'waves' of transmission (ie n+1 'path delay profiles' to be handled in the equaliser/rake receiver). There may be significant memory requirement with these approaches, since the techniques require buffering of multiple millisecond's worth of (so-called 'soft', or undetected) received signal information prior to detection being performed.

In a further example the transmission of a given MBMS packet from the relay node layer and from the donor eNodeB layer can be made using the same scrambling code in order that soft combining can be achieved more easily.

Various further aspects and features of the present invention are defined in the appended claims.

The invention claimed is:

1. A mobile communications network for communicating a sequence of data blocks to mobile communications devices via a wireless access interface, the mobile communications network including
    a plurality of base stations disposed throughout the network and arranged in operation to transmit to the mobile communications devices a broadcast signal providing the sequence of data blocks in a sequence of transmission frames, each data block of the sequence being transmitted by each of the base stations contemporaneously for each of the sequence of transmission frames, and
    one or more relay nodes arranged in operation to receive the broadcast signal transmitted by one of the base stations and to retransmit the broadcast signal, the broadcast signal being re-transmitted as the sequence of data blocks on the same frequency as the broadcast signal transmitted by the base station, so that one or more of the mobile communications devices can receive the broadcast signal and recover the sequence of data blocks from one or both of the broadcast signal transmitted by the base station or the broadcast signal transmitted by the relay node, wherein
    the mobile communications devices each include
        a receiver arranged in operation to detect each of the broadcast signal transmitted by the base station and the broadcast signal re-transmitted by the relay node, and
        circuitry which is arranged in operation to recover the data blocks from one or the other of the broadcast signal transmitted by the base station or the broadcast signal re-transmitted by the relay node depending on a relative power of the broadcast signal transmitted by the base station and the broadcast signal transmitted by the relay node.

2. The mobile communications network as claimed in claim 1, wherein
    the sequence of data blocks transmitted by the one or more base stations are transmitted in one or more sub-frames of each of a sequence of frames, and
    the relay node is configured to transmit the sequence of data blocks displaced in time with respect to the transmission of the sequence of data blocks after one transmission frame or sub-frame so that each of the data blocks received in a first transmission frame or sub-frame is transmitted in a second following frame or sub-frame.

3. The mobile communications network as claimed in claim 1 wherein the mobile communications devices each include
an equalizer which is arranged to receive an indication of a relative strength and a difference in time between the broadcast signal transmitted by the base station or the broadcast signal re-transmitted by the relay node and to combine the broadcast signal transmitted by the base station and the broadcast signal re-transmitted by the relay node to the effect of reducing mutual interference, and
the circuitry which is arranged in operation to recover the data blocks from the combination of the broadcast signal transmitted by the base station and the broadcast signal re-transmitted by the relay node.

4. The mobile communications network as claimed in claim 1, wherein
the broadcast signal transmitted by the base station and re-transmitted by the relay node is an Orthogonal Frequency Division Multiplexed (OFDM) signal,
the receiver includes a Fast Fourier Transform (FFT) processor, which is arranged in operation to detect the broadcast signal transmitted by the base station and the broadcast signal re-transmitted by the relay node, to form a frequency domain representation of the combined signal, and
the circuitry is arranged in operation to recover the data blocks from the combined broadcast signal transmitted by the base station and the broadcast signal re-transmitted by the relay node.

5. The mobile communications network as claimed in claim 1, wherein
the broadcast signal transmitted by the base station and re-transmitted by the relay node are in accordance with Code Division Multiple Access (CDMA)
the receiver includes a rake receiver which is arranged in operation to combine the broadcast signal transmitted by the base station and the broadcast signal re-transmitted by the relay node, to form a combined signal, and
the circuitry is arranged in operation to recover the data blocks from the combined signal.

6. The mobile communications network as claimed in claim 1, wherein
the relay node is arranged to receive each of the sequence of data blocks transmitted by one or more of the base stations and to re-transmit the sequence of data blocks as the broadcast signal, the transmission by the relay node being at the same time and the same frequency as the transmission by the one or more base stations from which the sequence of data blocks was received by the relay node and the transmission of the sequence of the data blocks by the relay node being displaced by one or more data blocks behind the transmission of the sequence of data blocks by the base station from which the sequence of data blocks was received.

7. A mobile communications device arranged to receive data from a mobile communications network via a wireless access interface, the mobile communications network including a plurality of base stations disposed throughout the network and arranged in operation to transmit to the mobile communications devices a broadcast signal providing a sequence of data blocks in a sequence of transmission frames, each data block of the sequence being transmitted by each of the base stations contemporaneously for each of the sequence of transmission frames, and
one or more relay nodes configured to receive the broadcast signal transmitted by one of the base stations and to retransmit the broadcast signal, the broadcast signal being re-transmitted as the sequence of data blocks in the sequence of transmission frames on the same frequency as the broadcast signal transmitted by the base station, the mobile communications device comprising
a receiver, the receiver being arranged in operation to
receive the broadcast signal transmitted by one of the base stations and the broadcast signal retransmitted by one of the relay nodes and to recover the sequence of data blocks from one or both of the broadcast signal transmitted by the base station or the broadcast signal re-transmitted by the relay node,
detect each of the broadcast signal transmitted by the base station and the broadcast signal re-transmitted by the relay node, and
recover the data blocks from one or the other of the broadcast signal transmitted by the base station or the broadcast signal re-transmitted by the relay node depending on a relative power of the broadcast signal transmitted by the base station and the broadcast signal transmitted by the relay node.

8. The mobile communications device as claimed in claim 7, wherein the receiver is arranged in operation to
detect each of the broadcast signal transmitted by the base station and the broadcast signal re-transmitted by the relay node,
receive an indication of a relative strength and a difference in time between the broadcast signal transmitted by the base station or the broadcast signal re-transmitted by the relay node and to combine the broadcast signal transmitted by the base station and the broadcast signal re-transmitted by the relay node to the effect of reducing mutual interference and
recover the data blocks from the combination of the broadcast signal transmitted by the base station and the broadcast signal re-transmitted by the relay node.

9. The mobile communications device as claimed in claim 7, wherein the broadcast signal transmitted by the base station and re-transmitted by the relay node is an Orthogonal Frequency Division Multiplexed, OFDM, signal and the receiver includes
a Fast Fourier Transform, FFT, processor, which is arranged in operation to combine the broadcast signal transmitted by the base station and the broadcast signal re-transmitted by the relay node, to form a frequency domain representation of the combined signal, and
the receiver is arranged in operation to recover the data blocks from the combined broadcast signal transmitted by the base station and the broadcast signal re-transmitted by the relay node.

10. The mobile communications device as claimed in claim 7, wherein the broadcast signal transmitted by the base station and re-transmitted by the relay node are in accordance with Code Division Multiple Access, CDMA, and the receiver includes
a rake receiver which is arranged in operation to combine the broadcast signal transmitted by the base station and the broadcast signal re-transmitted by the relay node, to form a combined signal, and
the receiver is arranged in operation to recover the data blocks from the combined signal.

11. A method for communicating data to mobile communications devices from a mobile communications network by transmitting and receiving data via a wireless access interface, the method comprising transmitting from one or more base stations to the mobile communications devices a broadcast signal providing a sequence of data blocks in a sequence of transmission frames, each data block of the sequence being transmitted by each of the base stations contemporaneously for each of the sequence of transmission frames, and receiving at one or more relay nodes the broadcast signal transmitted by one or more of the base stations, retransmitting the broadcast signal as the sequence of data blocks in the sequence of transmission frames on the same frequency as the broadcast signal transmitted by the base station, so that one or more of the mobile communications devices can receive the broadcast signal and recover the sequence of data blocks from one or both of the broadcast signal transmitted by the base station or the broadcast signal transmitted by the relay node, detecting, by at least one of the mobile communication devices, each of the broadcast signal transmitted by the base station and the broadcast signal re-transmitted by the relay node, and recovering, by the at least one of the mobile communication devices, the data blocks from one or the other of the broadcast signal transmitted by the base station or the broadcast signal re-transmitted by the relay node depending on a relative power of the broadcast signal transmitted by the base station and the broadcast signal transmitted by the relay node.

12. The method as claimed in claim 11, wherein the re-transmitting the broadcast signal as the sequence of data blocks includes re-transmitting the sequence of data blocks as the broadcast signal at the same time and the same frequency as the transmission by the one or more base stations from which the sequence of data blocks, the re-transmission of the sequence of the data blocks by the relay node being displaced by one or more data blocks behind the transmission of the sequence of data blocks by the base station from which the sequence of data blocks was received.

\* \* \* \* \*